US008556109B2

United States Patent
Fujita

(10) Patent No.: US 8,556,109 B2
(45) Date of Patent: Oct. 15, 2013

(54) OPENING STRUCTURE OF FUEL TANK AND FABRICATING METHOD THEREOF

(75) Inventor: Syumei Fujita, Inazawa (JP)

(73) Assignee: FTS Co., Ltd., Aichi-ken (JP)

( * ) Notice: Subject to any disclaimer, the term of this patent is extended or adjusted under 35 U.S.C. 154(b) by 1288 days.

(21) Appl. No.: 12/071,185

(22) Filed: Feb. 19, 2008

(65) Prior Publication Data

US 2008/0210692 A1 Sep. 4, 2008

(30) Foreign Application Priority Data

Feb. 27, 2007 (JP) ................. 2007-047316

(51) Int. Cl.
*B60K 15/04* (2006.01)
(52) U.S. Cl.
USPC .................. 220/562; 220/319; 220/601
(58) Field of Classification Search
USPC ......... 220/562–564, 297–298, 288, 319, 601, 220/643–644, 320
See application file for complete search history.

(56) References Cited

U.S. PATENT DOCUMENTS

| | | | |
|---|---|---|---|
| 4,998,639 A | 3/1991 | Seizert et al. | |
| 5,207,463 A * | 5/1993 | Seizert et al. | 292/256.6 |
| 6,332,555 B1 | 12/2001 | Stangier | |
| 6,516,964 B1 * | 2/2003 | Gerhardt et al. | 220/4.14 |
| 6,533,288 B1 | 3/2003 | Brandner et al. | |
| 6,698,613 B2 | 3/2004 | Goto et al. | |
| 7,083,065 B2 * | 8/2006 | Zdroik | 220/562 |
| 2003/0029871 A1 * | 2/2003 | Goto et al. | 220/562 |
| 2007/0221674 A1 * | 9/2007 | Mori et al. | 220/562 |

FOREIGN PATENT DOCUMENTS

| | | |
|---|---|---|
| JP | U-59-136324 | 9/1984 |
| JP | B-2899409 | 3/1999 |
| JP | A-2002-39028 | 2/2002 |
| JP | A-2002-187162 | 7/2002 |
| JP | A-2003-54268 | 2/2003 |
| JP | A-2003-220840 | 8/2003 |
| JP | A-2004-047150 | 2/2004 |

OTHER PUBLICATIONS

Office action issued on May 16, 2011 in the corresponding Japanese patent application No. 2007-047316 (English translation enclosed).

* cited by examiner

*Primary Examiner* — J. Gregory Pickett
*Assistant Examiner* — Robert Poon
(74) *Attorney, Agent, or Firm* — Posz Law Group, PLC

(57) ABSTRACT

There are provided a structure of an opening portion for integrally forming an opening portion to a fuel tank main body made of a thermoplastic synthetic resin having at least an outer layer, an inner layer and a middle layer therebetween and its fabricating method. The opening portion is constituted by a cylindrical portion and a folded portion folded in a hairpin shape. At least a portion of the folded portion includes a compression portion compressed from a direction orthogonal to an opening face and more thin-walled than other portion. An outer layer of the cylindrical portion is integrally embedded with a portion of a lid lock member made of a metal in a ring-like shape having a plurality of lock holes, an engaging claw portion of an attaching member made of a metal in a ring-like shape having the engaging claw portion engaged with the lock hole of the lid lock member is engaged with the lock hole, and a lid member for closing the opening portion is clamped by the opening portion and the attaching member.

3 Claims, 5 Drawing Sheets

OPENING STRUCTURE OF FUEL TANK AND FABRICATING METHOD THEREOF

BACKGROUND OF THE INVENTION

1. Field of the Invention

The present invention relates to an opening portion structure of a fuel tank made of a thermoplastic synthetic resin and its fabricating method, particularly relates to an opening portion structure of a fuel tank made of a thermoplastic synthetic resin and its fabricating method for forming a fuel tank main body by subjecting a synthetic resin member having a plurality of layers to blow forming and forming an opening portion integrally with the fuel tank main body.

2. Related Art

Although in a related art, there is used a structure of a fuel tank for an automobile or the like made of a metal, in recent years, there has been used a structure of a fuel tank made of a thermoplastic synthetic resin owing to light-weighted formation of a vehicle, because rust is not generated thereon, the structure is easy to be formed into a desired shape and so on.

In fabricating a fuel tank for an automobile made of a synthetic resin, there has frequently been used a blow forming method owing to an easiness in forming a hollow member. According to the blow forming method, a fuel tank for an automobile is fabricated by constituting a parison of a molten thermoplastic synthetic resin member by a cylindrical shape to be extruded from above, clamping the parison by a die and blowing air into the parison.

The fuel tank is formed with an opening portion for bringing in and out a part to be mounted to inside of the tank. In forming the opening portion, simultaneously with forming a fuel tank main body by blow forming, the opening portion is formed integrally therewith.

As shown in, for example, FIG. 8, a structure thereof is attached with an opening portion 110 and a lid member 140 for closing the opening (refer to, for example, JP-A-2002-187162).

According to a constitution of FIG. 8, a cam lock member 120 for locking the lid member 140 is embedded to a periphery of the opening portion 110, the lid member 140 is clamped by a fixing member 130 in a ring-like shape and the opening portion 110, the fixing member 130 is pressed by the cam lock member 120 to thereby fix the lid member 140. At this occasion, in order to seal an interval between the lid member 140 and the opening portion 110, a seal ring 150 is attached to therebetween. In order to attach the seal ring 150, a groove portion 116 is formed at a face of the opening portion 110 opposed to the lid member 140.

Although a smooth face is needed for the groove portion 116 in order to ensure seal performance, when the groove portion 116 is formed by blow forming, a sufficient smooth face is not provided by only pressing the groove portion 116 to an inner face of a blow forming die by an inner pressure of blow. Further, in order to prevent gasoline from being permeated from an end face of the opening portion 110, it is necessary to thin a wall thickness of the groove portion 116 of the opening portion 110.

However, when a slide die is moved to form the groove portion 116 from a direction orthogonal to the opening portion 110 to compress the groove portion 116 in forming the groove portion 116 in order to form the portion of the groove portion 116 to be thin, since the cam lock member 120 is only embedded at the portion of the opening portion 110, and therefore, there is not a portion of holding the portion of the groove portion 116, a pressure of the compressing die cannot be received and it is difficult to compress the groove portion 116.

Further, the cam lock member 120 is projected from the opening portion 110 in an outer direction, and therefore, it is necessary to ensure a gap between the cam lock member 120 and a peripheral part, a large space is needed, a volume of the fuel tank is reduced, or a structure of the blow molding die becomes complicated.

Further, as shown in FIG. 9, there is also a structure for forming a fuel tank main body 201 by a thermoplastic synthetic resin of a multilayers structure (refer to, for example, JP-A-2003-220840). In this case, there is formed a thermoplastic synthetic resin member constituting an inner layer and an outer layer by high density polyethylene (HDPE) maintaining a strength necessary for the fuel tank and also strong at a fuel and constituting a middle layer as a barrier layer for preventing the fuel from being permeated therebetween.

In this case, at an opening portion 210, in order to attach a lid member 240 to the opening portion 210, a ring-like member 220 formed with a screw at an outer periphery thereof is integrally and fixedly attached to the opening portion 210. A face of the ring-like member 220 opposed to the lid member 240 is integrally and fixedly attached with a folded portion 212 of the opening portion 210 and a portion of the folded portion 212 is formed with a compression portion 213. A seal ring 250 is installed at inside of the compression portion 213 to seal an interval between the lid member 240 and the opening portion 210. However, the ring-like member 220 is formed by a synthetic resin and therefore, a strength thereof is low and it is difficult to ensure a sufficient rigidity against an external force.

Further, in order to fix the lid member 240 to the opening portion 210, a fixing member 230 in a ring-like shape and formed with a screw groove at inside thereof to the ring-like member 220, and therefore, time is taken for attachment, a predetermined length is needed at the screw portion, a height of the opening portion 210 is heightened, and a space is needed. Further, when the screw is excessively fastened tightly, since the ring-like member 220 is made of the synthetic resin, there is also a concern that the ring-like member 220 or the fixing member 230 is plastically deformed.

SUMMARY OF THE INVENTION

Therefore, an object of the invention is to provide a structure of an opening portion of the fuel tank having a large tank volume, facilitating to attach a lid member, excellent in a seal performance and reducing permeation of a fuel from an opening portion and a method of fabricating the fuel tank.

The first aspect of the invention is a structure of an opening portion of a fuel tank, comprising:

a fuel tank main body made of a thermoplastic synthetic resin having at least an outer layer, an inner layer and a middle layer therebetween; and an opening portion integrally formed with the fuel tank main body;

wherein the opening portion is constituted by a cylindrical portion extended from the fuel tank main body to an outer side, and a folded portion folded from a front end of the cylindrical portion in a direction of enlarging a diameter of the cylindrical portion and is further folded in a shape of a hairpin in a direction of a center of the opening portion, laminated with layers of a thermoplastic synthetic resin on upper and lower sides thereof and having an outer face in parallel with an opening face of the opening portion, at least a portion of the folded portion includes a compression portion compressed from a direction orthogonal to the opening face and more thin-walled than other portion; and wherein the outer layer of the cylindrical portion is integrally embedded with a portion of a lid lock member in a ring-like shape made of a metal having a plurality of lock holes, an engaging claw portion of an attaching member in a ring-like shape made of a metal having the engaging claw portion engaged with the lock hole of the lid lock member is engaged with the lock hole, and a lid member for closing the opening portion is clamped by the opening portion and the attaching member.

According to the first aspect of the invention, the opening portion is constituted by the cylindrical portion extended from the fuel tank main body to the outer side, and the folded portion folded from the front end of the cylindrical portion in the direction of enlarging the diameter of the cylindrical portion and further folded in the shape of the hairpin in the direction of the center of the opening portion, laminated with the layers of the thermoplastic synthetic resin on upper and lower sides and in parallel with the opening face of the opening portion. Therefore, the opening portion is integrally formed from the fuel tank main body, excellent in hermetically closing performance, capable of ensuring the wall thickness of the folded portion and capable of holding a seal member. According to the folded portion, the outer face is formed by the outer layer of the fuel tank main body, and therefore, the strength can be ensured, and the folded portion can prevent permeation of a fuel since the folded portion includes the middle layer comprising a material of a fuel permeation preventing property at inside thereof.

At least a portion of the folded portion includes the compression portion compressed from the direction orthogonal to the opening face and thin-walled more than other portion, and therefore, a wall thickness of the opening portion can be thinned at the compression portion, and it can be minimized that the fuel permeates by passing the compression portion from the front end of the opening portion. Further, the thin-walled portion can be fitted with a seal member, and sealing performance can be ensured. Further, by compressing the compression portion, a smoother face can be formed and the seal performance can further be promoted.

A portion of the lid lock member made of a metal in a ring-like shape having the plurality of lock holes is integrally embedded to the outer layer of the cylindrical portion, the engaging claw portion of the attaching member in the ring-like shape made of a metal having the engaging claw portion engaged with the lock hole of the lid lock member is engaged with the lock hole, and the lid member closing the opening portion is clamped by the opening portion and the attaching member. Therefore, the attaching member is formed with the engaging claw portion, the lid lock member is not provided with the engaging claw portion, the lid lock member is easy to be held by a die, it is easy to embed a portion of the lid lock member to the opening portion, a portion of the lid lock member is not subjected from the opening portion, and a space for the fuel tank is reduced. Further, the opening portion can firmly be sealed by firmly clamping the lid member by the lid lock member and the attaching member.

The second aspect of the invention is the structure of an opening portion of a fuel tank, wherein the attaching member is formed by an upper flat plate portion in a ring-like shape for pressing a surrounding of the lid member to the opening portion and having a plane in parallel with the opening face, lower vertical wall portions folded to a lower side in steps from a plurality of portions of a front end of the upper flat plate portion and engaged with the lock holes of the lid lock member, and an engaging claw portion bent in an L-like shape from a front end of the lower vertical wall portion in a direction of a center of the opening portion and engaged with a lower face of the lid lock member.

According to the second aspect of the invention, the attaching member includes the upper flat plate portion in the ring-like shape for pressing the surrounding of the lid member to the opening portion and having the plane in parallel with the opening face, and therefore, when the attaching member is attached to the lid lock member, all the surrounding of the lid member for closing the opening portion is pressed by the upper flat plate portion to be able to be brought into close contact with the opening portion and the sealing performance between the opening portion and the lid member can be ensured.

The attaching member includes the lower vertical wall portions folded to a lower side in steps from the plurality of portions of the front end of the upper flat plate portion and engaged with lock holes of the lid lock member, and the engaging claw portion bent in the L-like shape from the front end of the lower vertical wall portion in the direction of the center of the opening portion and engaged with the lower face of the lid lock member. Therefore, when the lower vertical wall portion of the attaching member is inserted into the lock hole of the lid lock member and the attaching member is pivoted, the engaging claw portion is brought into close contact with the lower face of the lid lock member and the attaching member can solidly be attached to the lid lock member.

Further, the attaching member is constituted by a cam lock structure, and therefore, by only slightly rotating the lid member and the attaching member in being locked, the lid member can be locked, integration is facilitated and a height of the opening portion can be made to be low.

The third aspect of the invention is the structure of an opening portion of a fuel tank, wherein the lid lock member is formed by a lock upper face portion in a ring-like shape having a plurality of the lock holes each including a wide width portion and a narrow width portion in a circumferential direction and having a plane in parallel with the opening face, a lock stepped portion bent to a lower side in steps from the lock upper face portion, a lock flat plate portion bent in an L-like shape from the lock stepped portion in the direction of the center of the opening portion and having a plane in parallel with the opening face, and a lock vertical wall portion formed by being bent from the lock flat plate portion to the lower side.

According to the third aspect of the invention, the lid lock member includes the plurality of lock holes each having the wide width portion and the narrow width portion in the circumferential direction, and includes the lock upper face portion in the ring-like shape having the plane in parallel with the opening face. Therefore, when the engaging claw portion of the attaching member is inserted to the wide width portion of the lock hole and is pivoted to the narrow width portion of the lock hole, the attaching member can solidly be attached. Further, the lock upper face portion is in parallel with the opening portion, and therefore, the lock upper face portion is not projected from the opening portion and the space of attaching the fuel tank can be reduced.

The lid lock member includes the lock stepped portion bent to the lower side in steps from the lock upper face portion, and therefore, the end portion of the folded portion of the opening portion can be held and the lock flat plate portion of the lid lock member can be disposed at the lower face of the folded portion of the opening portion.

The lid lock member includes the lock flat plate portion bent in the L-like shape from the lock stepped portion in the direction of the center of the opening portion and having the plane in parallel with the opening face, therefore, the lower face of the opening portion is held, and when the lid member is pressed by the attaching member, the lid member can be clamped by the lock flat plate portion and the upper flat plate portion of the attaching member. Further, when a compression portion is formed by a die, it is easy to hold the folded portion by the lid lock member from the lower side and compress the folded portion, and also when the lid member is attached to the opening portion, the lid member and the folded portion of the opening portion can strongly brought into close contact with each other.

The lid lock member includes the lock vertical wall portion formed by being bent from the lock flat plate portion to the lower side, and therefore, when the lock vertical wall portion of the lid lock member is embedded to the cylindrical portion of the opening portion, the lock vertical wall portion is embedded to the outer layer of the cylindrical portion of the opening portion, a total of the lid lock member can solidly be held and the strength in the diameter direction of the cylindrical portion of the opening portion can be increased.

The fourth aspect of the invention is the structure of an opening portion of a fuel tank, wherein in the lid lock member, the lock flat plate portion holds the outer layer on a lower side of a portion laminated with the compression portion, the lock vertical wall portion is formed with a plurality of notch portions or fixing holes, and embedded with the outer layer of the opening portion and the synthetic resin of the outer layer invades the notch portion or the fixing hole.

According to the fourth aspect of the invention, in the lid lock member, the lock flat plate portion holds the outer layer on the lower side of the portion laminated with the compression portion, and therefore, the middle layer of the compression portion is maintained as it is, permeation of the fuel can be prevented at the compression portion, and when attached with the attaching member, deformation of the compression portion can be prevented.

The lock vertical wall portion of the lid lock member is formed with the plurality of notch portions or fixing holes, embedded to the outer layer of the opening portion and the synthetic resin of the outer layer invades the notch portion or the fixing hole, and therefore, the lid lock member is not shifted at inside of the opening portion, and the lock vertical wall portion can solidly be fixed to the outer layer of the opening portion.

The fifth aspect of the invention is the structure of an opening portion of a fuel tank, wherein the compression portion is formed with a groove portion in a shape of a groove having a section in a channel-like shape, a bottom face of the groove portion is formed with a smooth face, and the groove portion is attached with a seal member.

According to the fifth aspect of the invention, the compression portion is formed into the groove portion having the section in the channel-like shape, the bottom face of the groove portion is formed with the smooth face, and the groove portion is attached with the seal member, and therefore, the seal member can firmly be held at inside of the groove portion, the seal member is brought into close contact with the smooth face, and therefore, the sealing performance is excellent.

The sixth aspect of the invention is a method of fabricating a fuel tank forming a fuel tank main body by subjecting a thermoplastic synthetic resin member having at least an outer layer, an inner layer and a middle layer therebetween to blow forming and integrally forming an opening portion;

wherein in subjecting the fuel tank main body to the blow forming, a cylindrical portion of the opening portion is formed by extending a portion to an outer side from the fuel tank main body, a folded portion is formed by folding to bend the cylindrical portion from a front end of the cylindrical portion in a direction of enlarging a diameter of the cylindrical portion and further folding to bend the cylindrical portion in a shape of a hairpin in a direction of a center of the opening portion and laminating the thermoplastic synthetic resin member into two layers to provide an outer face in parallel with the opening face of the opening portion, at least one portion of the folded portion is compressed from a direction orthogonal to the opening face to thereby form a compression portion thin-walled more than other portion; and wherein a portion of a lid lock member in a ring-like shape made of a metal having a plurality of lock holes is integrally embedded to the outer layer of the cylindrical portion, the opening portion is formed by cutting to remove the thermoplastic synthetic resin member for closing a portion of opening the opening portion, the opening portion is closed by a lid member, an engaging claw portion of an attaching member in a ring-like shape made of a metal having the engaging claw portion engaged with the lock hole of the lid lock member is engaged with the lock hole and the lid member is clamped by the opening portion and the attaching member.

According to the sixth aspect of the invention, when subjecting the fuel tank main body to the blow forming, the cylindrical portion of the opening portion is formed by extending a portion of the fuel tank main body to the outer side from the fuel tank main body, and therefore, the opening portion including the cylindrical portion simultaneously with carrying out the blow forming and the forming is facilitated.

By folding to bend the cylindrical portion in the direction of enlarging the diameter of the cylindrical portion from the front end of the cylindrical portion and further folding to bend the cylindrical portion in the shape of the hairpin in the direction of the center of the opening portion, the thermoplastic synthetic resin member is laminated in two layers and the folded portion is formed to include the outer face in parallel with the opening face of the opening portion. Therefore, the opening portion including the folded portion can integrally be formed from the fuel tank main body, the opening portion is excellent in hermetically closing performance and the wall thickness of the folded portion other than the compression portion can be ensured. According to the folded portion, the outer face is formed by the outer layer of the fuel tank main body, and therefore, the strength can be ensured and the folded portion includes the middle layer having the fuel permeation preventing property at inside thereof, and therefore, permeation of the fuel can be prevented.

At least the portion of the folded portion is formed with the compression portion compressed from the direction orthogonal to the opening face and thin-walled more than the other portion, and therefore, by only compressing the folded portion, the wall thickness of the opening portion can be formed to be thin at the compression portion, and permeation of the fuel passing the outer layer of the compression portion from the front end of the opening portion can be minimized. The folded portion is compressed by a die, and therefore, the surface of the compression portion can be formed to be smooth, the performance of being brought into close contact with the seal member is promoted and the sealing performance is excellent.

The outer layer of the cylindrical portion is integrally embedded with a portion of the lid lock member in the ring-like shape made of a metal having the plurality of lock holes, and therefore, when the compression portion is formed, the folded portion can be held by the lid lock member from the lower side, it is easy to compress the folded portion and the lid member and the opening portion can strongly be brought into close contact with each other also when the lid member is attached to the opening portion.

The opening portion is formed by cutting to remove the thermoplastic synthetic resin member closing the portion of opening the opening portion, the opening portion is closed by the lid member, the engaging claw portion of the attaching member in the ring-like shape made of a metal having the engaging claw portion engaged with the lock hole of the lid lock member is engaged with the lock hole and the lid member is clamped by the opening portion and the attaching member. Therefore, by inserting the engaging claw portion of the attaching member into the lock hole of the lid lock member and slightly pivoting the attaching member, the lid member can solidly be held by the opening portion to seal.

The seventh aspect of the invention is a method of fabricating a fuel tank characterized in a method of fabricating a fuel tank forming a fuel tank main body by subjecting a thermoplastic synthetic resin member having at least an outer layer, an inner layer and a middle layer therebetween to blow forming and integrally forming an opening portion;

wherein a lid lock member in a ring-like shape made of a metal is held by a portion of a blow forming die for forming the opening portion;

wherein a slide die is provided on an outer side of a portion of the blow forming die holding the lid lock member and a projected rib portion is formed at a peripheral end of an inner face of the slide die;

wherein in subjecting the fuel tank main body to the blow forming, a cylindrical portion of the opening portion is formed by moving back the slide die to a backside and extending a portion of the thermoplastic synthetic resin member of the fuel tank main body to an outer side;

wherein the thermoplastic synthetic resin member of the cylindrical portion is made to advance to between the lid lock member and the projected portion of the slide die, a diameter thereof is enlarged, the thermoplastic synthetic resin member of the opening portion is brought into contact with an inner face of the slide die, the cylindrical portion is folded from a front end of the cylindrical portion in a direction of enlarging a diameter of the cylindrical portion and further folded in a shape of a hairpin in a direction of a center of the opening portion to laminate the thermoplastic synthetic resin member into two layers to thereby form a folded portion, the slide die is made to advance in a direction of the lid lock member, and at least a portion of the folded portion is compressed from a direction orthogonal to the opening face to thereby form a compression portion more thin-walled than other portion; and wherein a portion of the lid lock member is integrally embedded to the outer layer of the cylindrical portion, the opening portion is formed by cutting to remove the thermoplastic synthetic resin member closing a portion opening the opening portion, the opening portion is closed by a lid member, an engaging claw portion of an attaching member in a ring-like shape made of a metal having the engaging portion engaged with a lock hole of the lid lock member is engaged with the lock hole and the lid member is clamped by the opening portion and the attaching member.

According to the seventh aspect of the invention, the lid lock member in the ring-like shape made of a metal is held at the portion of the blow forming die for forming the opening portion, the slide die is provided on the outer side of the portion of the blow forming die for holding the lid lock member and the projected rib portion is formed at the peripheral end of the inner face of the slide die. Therefore, the folded portion can be formed by the lid lock member and the portion of the slide die and the lid lock member can be embedded to the opening portion in the blow forming.

In subjecting the fuel tank main body to the blow forming, the cylindrical portion of the opening portion is formed by moving back the slide die to the outer side and extending a portion of the thermoplastic synthetic resin member of the fuel tank main body to the outer side, and therefore, the thermoplastic synthetic resin member for forming the fuel tank main body is swollen to the portion of moving back the slide die to thereby enable to form the cylindrical portion simultaneously with forming the fuel tank main body and the forming operation is facilitated.

The thermoplastic synthetic resin member of the cylindrical portion is made to advance to between the lid lock member and the projected rib portion of the slide die, the diameter is enlarged, the thermoplastic synthetic resin member of the opening portion is brought into contact with the inner face of the slide die, the cylindrical portion is folded from the front end of the cylindrical portion in the direction of enlarging the diameter of the cylindrical portion, and the thermoplastic synthetic resin member is laminated in two layers by folding to bend the thermoplastic synthetic resin member in the shape of the hairpin in the direction of the center of the opening portion to thereby form the folded portion. Therefore, by invading the synthetic resin member of the fuel tank main body to between the lid lock member and the projected portion of the slide die, the folded portion can easily be formed, the wall thickness of the opening portion can be increased and the strength can be increased.

The compression portion thin-walled more than the other portion is formed by advancing the slide die in the direction of the lid lock member and compressing at least the portion of the folded portion from the direction orthogonal to the opening face, and therefore, by only advancing the slide die in the direction of the lid lock member, the compression portion can be formed at the folded portion in blow forming. Further, when the compression portion is formed, the folded portion can be held by the lid lock member from the lower side and it is easy to compress the folded portion.

The lid lock member is integrally embedded to the outer layer of the cylindrical portion, the opening portion is formed by cutting to remove the thermoplastic synthetic resin member closing the portion opening the opening portion, and therefore, when the fuel tank is formed, the lid lock member can simultaneously be embedded to the cylindrical portion and the strength of the cylindrical portion can easily be increased. Further, simultaneously with forming the fuel tank, the opening portion and the thermoplastic synthetic resin member closing the portion opening the opening portion are formed and by only cutting to remove the thermoplastic synthetic resin member closing the portion of opening the opening portion thereafter, the opened portion can be formed.

The opening portion is closed by the lid member, the engaging claw portion of the attaching member in the ring-like shape made of a metal having the engaging portion engaged with the lock hole of the lid lock member is engaged with the lock hole and the lid member is clamped by the opening portion and the attaching member, and therefore, by only slightly rotating the attaching member, the lid member can be locked by a cam lock mechanism, the lid member and the opening portion can strongly brought into close contact with each other, integration is facilitated and the height of the opening portion can be lowered.

The eighth aspect of the invention is the method of fabricating a fuel tank, wherein in forming the compression portion, a groove portion having a section in a channel-like shape is formed by the projected rib portion of the slide die, a bottom face of the groove portion is formed into a smooth face and a seal member is attached to the groove portion.

According to the eighth aspect of the invention, in forming the compression portion, the groove portion having the section in the channel-like shape is formed by the projected rib portion of the slide die, the bottom portion of the groove portion is formed by the smooth face, the seal member is attached to the groove portion, and therefore, the seal member can firmly be held at a predetermined position of the seal member, the seal member is brought into close contact with the smooth face, and therefore, the sealing performance is excellent.

According to the invention, the opening portion is constituted by the cylindrical portion extended from the fuel tank main body to the outer side and the folded portion folded in the direction of enlarging the diameter of the cylindrical portion from the front end of the cylindrical portion and having the outer face in parallel with the opening face of the opening portion, and therefore, the opening portion is integrally formed from the fuel tank main body, excellent in the hermetically closing performance and can hold the seal member. The folded portion includes the middle layer at inside thereof, and therefore, permeation of the fuel can be prevented. At least a portion of the folded portion includes the thin-walled compression portion, and therefore, permeation of the fuel can be minimized.

The outer layer of the cylindrical portion of the opening portion is integrally embedded with the lid lock member in the ring-like shape made of a metal, the engaging claw portion of the attaching member in the ring-like shape made of a metal having the engaging claw portion is engaged with the lock hole, the lid member closing the opening portion is clamped by the opening portion and the attaching member, and therefore, the attaching member is formed with the engaging claw portion, there is not the engaging claw portion at the lid lock member, the lid lock member is easy to be held by a die, it is easy to embed the lid lock member to the opening portion, a portion of the lid lock member is not projected from the opening portion, and the space for the fuel tank can be reduced

DETAILED DESCRIPTION OF THE PREFERRED EMBODIMENTS

A fuel tank according to an embodiment of the invention will be explained by taking an example of a fuel tank for an automobile in reference to FIG. 1 through FIG. 7.

Figure 1:
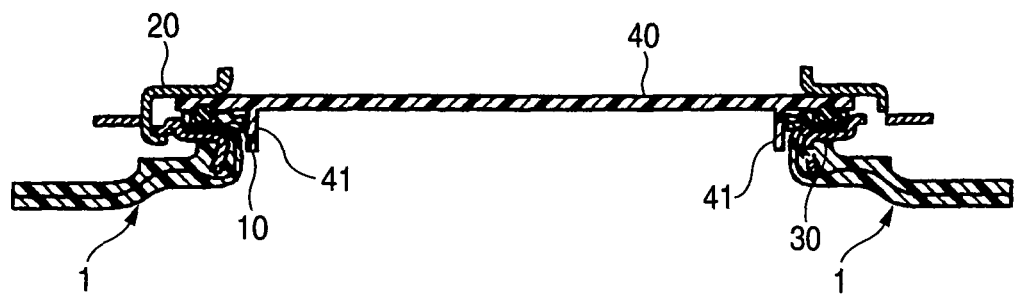
FIG. 1 is a sectional view of an opening portion of a fuel tank main body according to an embodiment of the invention.
Figure 2:
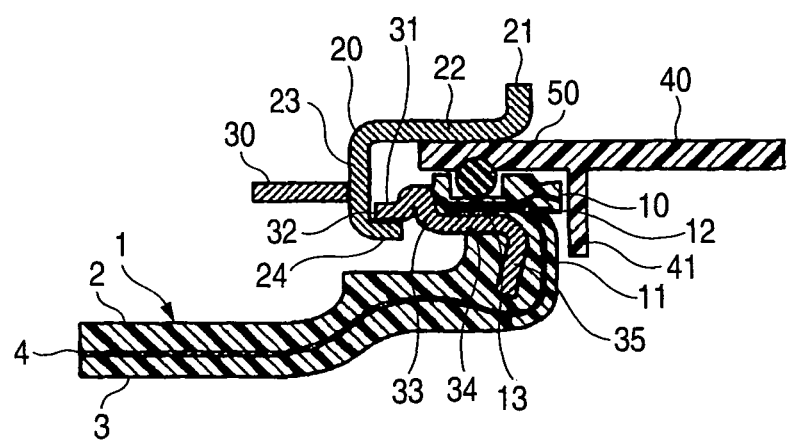
FIG. 2 is a sectional view enlarging a portion showing a structure of a portion of locking a lid member of the opening portion of FIG. 1.
Figure 3:
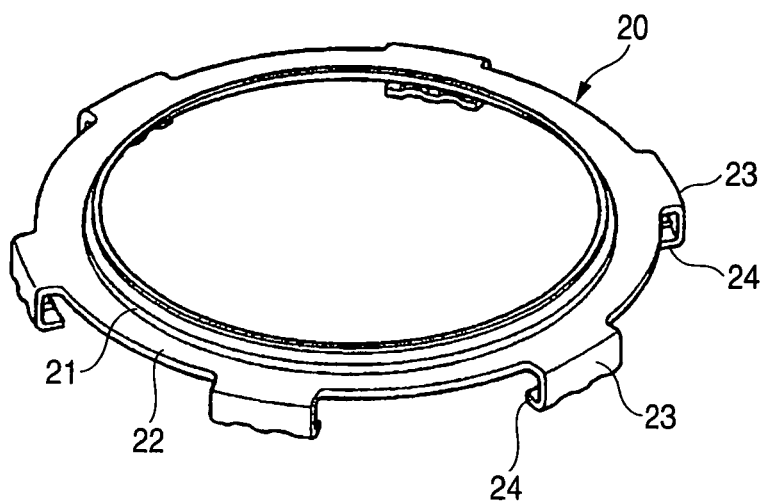
FIG. 3 is a perspective view of a lock plate used in the embodiment of the invention.
Figure 4:
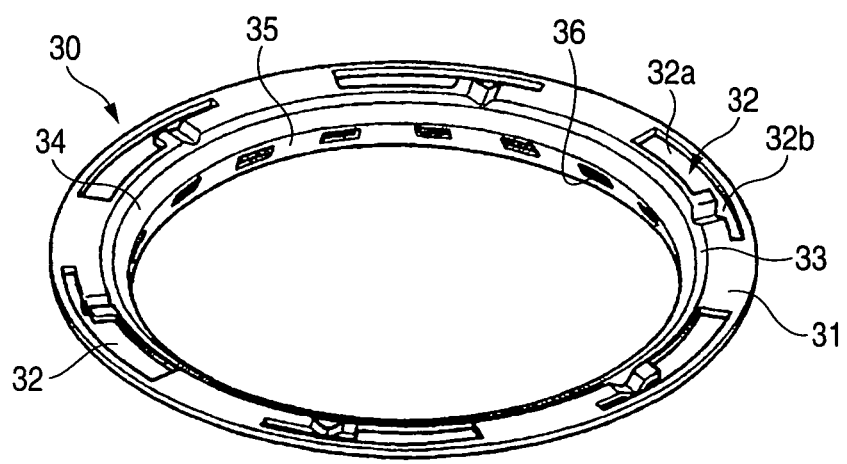
FIG. 4 is a perspective view of a lock ring used in the embodiment of the invention.

FIG. 1 is a sectional view of an opening portion 10 of a fuel tank according to a first embodiment of the invention. FIG. 2 is a sectional view enlarging a portion of locking a lid member 40 of FIG. 1. FIG. 3 is a perspective view of an attaching member (lock plate) 20 for attaching the lid member 40 according to the embodiment of the invention. FIG. 4 is a perspective view of a lid lock member (lock ring) 30 embedded in the opening portion 10 according to the embodiment of the invention.

Figure 5:
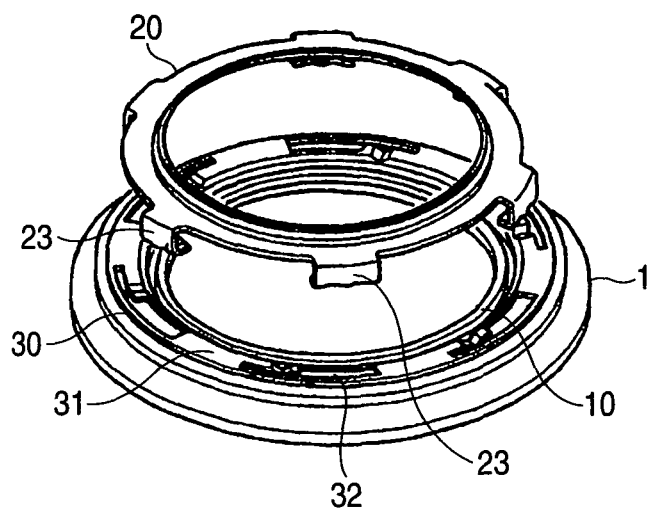
FIG. 5 is a disassembled perspective view showing a structure of fitting the lock plate to the lock ring according to the embodiment of the invention.

FIG. 5 is a disassembled perspective view showing a structure of fitting the lock plate 20 to the lock ring 30 at the opening portion 10 of the fuel tank according to the embodiment of the invention.

Figure 6:
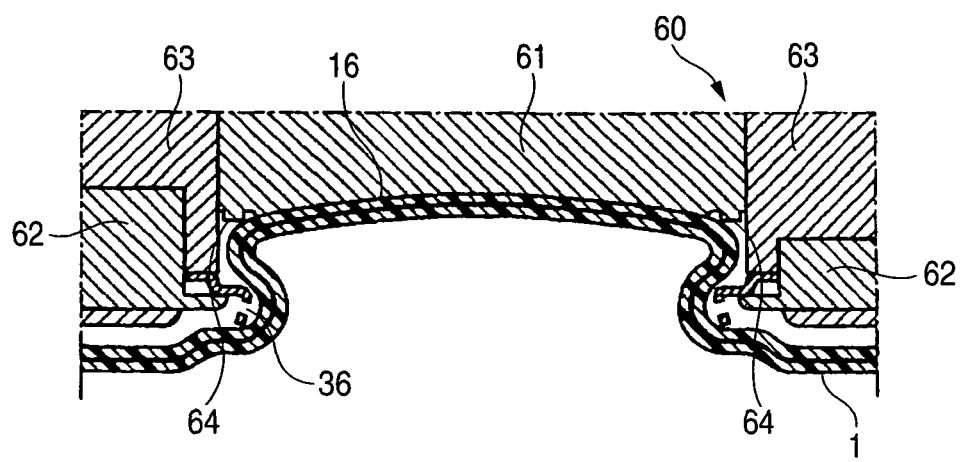
FIG. 6 is a sectional view of a state of sliding a slide die to an upper side at a portion of a blow forming die for the opening portion of the fuel tank main body used in the embodiment of the invention.
Figure 7:
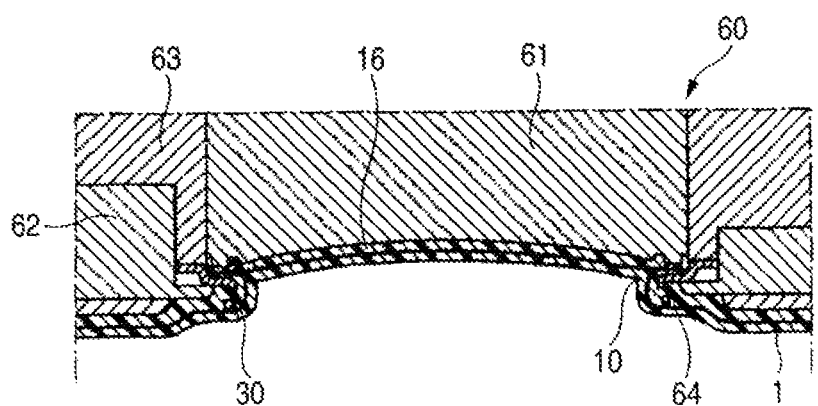
FIG. 7 is a sectional view showing a state of sliding the slide die to a lower side at the portion of the blow forming die for the opening portion of the fuel tank main body used in the embodiment of the invention.
Figure 8:
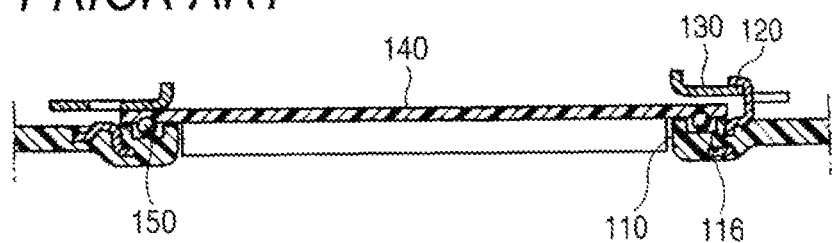
FIG. 8 is a sectional view of an opening portion of a fuel tank main body of a related art.
Figure 9:
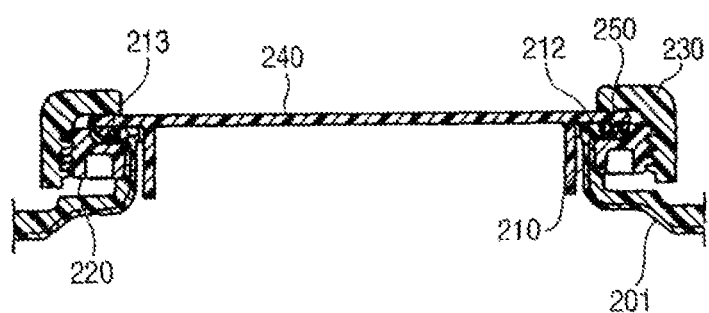
FIG. 9 is a sectional view of an opening portion of other fuel tank main body of a related art.

FIG. 6 and FIG. 7 are sectional views of a die portion of forming the opening portion 10 of a blow forming die 60 showing a method of fabricating the opening portion 10 of a fuel tank main body 1 of the invention.

According to the first embodiment of the invention, as shown in FIG. 1 and FIG. 2, the fuel tank is formed with the fuel tank main body 1 and the opening portion 10 for bringing in and out a fuel pump (not illustrated) or the like to and from the main body.

The fuel tank main body 1 is formed by blow forming, an outer wall thereof is constituted by three layers of an outer layer 2, an inner layer 3 and a middle layer 4 formed between the inner layer 3 and the outer layer 2. In blow forming, a parison constituted by the three layers is used.

The outer layer 2 and the inner layer 3 are formed from a thermoplastic synthetic resin having a high strength and maintaining the strength against a fuel oil, and the middle layer 4 is formed from thermoplastic synthetic resin by which permeation of the fuel oil is extremely inconsiderable.

As the thermoplastic synthetic resin constituting the outer layer 2 and the inner layer 3, for example, at least one kind of a material of high density polyethylene (HDPE), polyoxymethylene (POM), ethylene vinylalcohol copolymer (EVOH), nylon, polybutylene terephthalate, polyethylene terephthalate, polyphenylene sulfide can be used.

Further, as the thermoplastic synthetic resin constituting the middle layer 4, for example, ethylene vinylalcohol copolymer (EVOH), polybutylene terephthalate, polyethylene terephthalate, or polyphenylene sulfide (PPS) can be used.

Further, when a multilayers parison interposing a layer having an excellent adhering performance with high density polyethylene (HDPE) or the like at both faces of the middle layer 4 of ethylene vinylalcohol copolymer (EVOH) or the like, for example, interposing an adhered layer of denatured polyethylene (m-PE) is used, the performance of adhering the three layers is promoted, which is preferable.

As shown in FIG. 1, the opening portion 10 is formed at an upper face of the fuel tank main body 1 and the opening portion 10 is attached with the lid member 40 to be locked thereby.

According to the structure of locking the lid member 40 at the opening portion 10, as shown in FIG. 2, the lid member 40 is clamped by the lid lock member (lock ring) 30 embedded in the opening portion 10 and the attaching member (lock plate) 20.

The lid member 40 is formed substantially by a shape of a circular disk, and a lower face thereof is formed with a flange portion 41 projected along an inner periphery of the opening portion 10 to prevent the lid member 40 from being shifted.

According to the lock plate 20 for clamping the lid member 40, as shown in FIG. 3, an engaging claw portion 24 is extended from an upper flat plate portion 22 in a ring-like shape having a sectional shape in a flat plate shape. The lock ring 30 embedded in the opening portion 10 is formed with a lock hole 32 at a portion thereof in correspondence with the engaging claw portion 24 as shown in FIG. 4. The lid member 40 can be locked by inserting the engaging claw portion 24 to the lock hole 32 as described later.

The opening portion 10 of the fuel tank main body 1 is formed by being extended from the fuel tank main body 1 in an outer direction integrally and continuously by the same material. The opening portion 10 is embedded with the lock ring 30.

As shown in FIG. 2 and FIG. 4, the lock ring 30 is formed by a metal plate and is formed substantially by a shape of a bent cylinder.

The lock plate 20 presses a surrounding of the lid member 40 for closing the opening portion 10 of the fuel tank main body 1 to the opening portion 10, the upper flat plate portion 22 in the ring-like shape having a plane in parallel with the opening face is formed, when the lock plate 20 is attached to the lock ring 30, a total surrounding of the lid member 40 can be pressed by the upper flat plate portion 22, the lid member 40 can be brought into close contact with the opening portion 10, and the sealing performance can be ensured. An upper vertical wall portion 21 is extended by being bent from the front end of the upper flat plate portion 22 on a side of a center of the opening portion 10 and a front end of the lock plate 20 presses the lid member 40 smoothly without being caught by the lid member 40.

As shown in FIG. 2 and FIG. 3, lower vertical wall portions 23 folded to a lower side are extended from a plurality of portions of the front end of the lock plate 20 on an outer side of the upper flat plate portion 22 in steps by predetermined widths. Further, the engaging claw portion 24 bent in an L-like shape is formed from a front end of the lower vertical wall portion 23 in a direction of the center of the opening portion 10. As shown in FIG. 5, when the lock plate 20 is attached to the lock ring 30, the lower vertical wall portion 23 is inserted to the lock hole 32 of the lock ring 30, when the lock plate 20 is rotated slightly, as described later, since the lock plate 20 is constituted by a cam lock structure, the engaging claw portion 24 is engaged with a lower face of the lock ring 30 to fix the lock plate 20 and the lid member 40 can be clamped. Since the lower vertical wall portion 23 is extended to the lower side, a height of a total of the opening portion 10 can be lowered.

The engaging claw portion 24 can be formed by being bent in a waveform shape. Thereby, the engaging claw portion 24 and a lock upper face portion 31 mentioned later are made to operate as a spring to be able to lock the lid member 40.

As shown in FIG. 4, the lock ring 30 includes the lock upper face portion 31 in a ring-like shape having a flat face in parallel with the opening face. The lock upper face portion 31 is formed with a plurality of the lock holes 32 in a circumferential direction. The lock hole 32 is continuously formed with a wide width portion 32a and a narrow width portion 32b in the circumferential direction. In attaching the lock plate 20 to the lock ring 30, as shown in FIG. 2 and FIG. 5, when the lower vertical wall portion 23 and the engaging claw portion 24 of the lock plate 20 are inserted into the wide width portion 32a of the lock hole 32 and pivoted to bring the lower vertical wall portion 23 into the narrow width portion 32b of the lock hole 32, the engaging claw portion 24 is brought into close contact with a lower face of the lock upper face portion 31 and the lock plate 20 can solidly be attached thereto. Further, since the lock upper face portion 31 is in parallel with the opening portion 10, the lower vertical wall portion 23 or the like is not projected from the opening portion 10 and a space of attaching the fuel tank main body 1 can be reduced.

A lock stepped portion 33 is formed in steps from an end face on an inner side of the lock upper face portion 31 to a lower side. An end portion on a vehicle outer side of the folded portion 12 of the opening portion 10 is brought into contact with the lock stepped portion 33 to be held thereby, and therefore, the strength of the opening portion 10 can be increased. Further, by the lock stepped portion 33, a lock flat plate portion 34 is lowered from a position of the lock upper face portion 31 and the lock flat plate portion 34 of the lock ring 30 can be disposed at a lower face of the folded portion 12 of the opening portion 10.

There is formed the lock flat plate portion 34 bent in the L-like shape from the lock stepped portion 33 in the direction of the center of the opening portion 10 and having the plane in parallel with the opening face. The lock flat plate portion 34 holds the lower face of the compression portion 13, when the lid member 40 is pressed by the upper flat plate portion 22 of the lock plate 20, the lid member 40 can be clamped by the lock flat plate portion 34 and the upper flat plate portion 22 of the lock plate 20. Further, when the compression portion 13 is formed, it is easy to hold the folded portion 12 from a lower side by the lock ring 30 to compress the folded portion 12, and also in attaching the lid member 40 to the opening portion 10, the lid member 40 can strongly be pressed to the folded portion 12 of the opening portion 10.

A lock vertical wall portion 35 is formed by a cylindrical shape by being bent from the lock flat plate portion 34 to a lower side. According to the lock vertical wall portion 35, when the lock ring 30 is embedded to the opening portion 10, the lock vertical wall portion 35 is embedded to the outer layer 2 of the cylindrical portion 11 of the opening portion 10. Therefore, a total of the lock ring 30 can solidly be held by the lock vertical wall portion 35 and the lock vertical wall portion 35 can increase a strength in a diameter direction of the cylindrical portion 11 of the opening portion 10.

As shown in FIG. 4, the lock vertical wall portion 35 is formed with a plurality of fixing holes 36 as described later, in blow forming, a thermoplastic synthetic resin member of the cylindrical portion 11 of the opening portion 10 advances into the fixing hole 36 to be able to fixedly attach the lock ring 30 to the opening portion 10 without being shifted at inside of the cylindrical portion 11.

Further, a lower end of the lock vertical wall portion 35 can be formed with a plurality of pieces of notch portions in a waveform shape in place of the fixing holes. In this case, the thermoplastic synthetic resin member of the cylindrical portion 11 similarly advances to the notch portions in blow forming to be able to fixedly attach the lock ring 30 to the opening portion 10.

As shown in FIG. 2, the opening portion 10 is formed by the cylindrical portion 11 and the folded portion 12.

The cylindrical portion 11 is formed by extending the thermoplastic synthetic resin wall comprising three layers of the outer layer 2, the inner layer 3 and the middle layer 4 constituting the outer wall of the fuel tank main body 1 in the cylindrical shape from the fuel tank main body 1 to the outer side. The outer layer 2 of the cylindrical portion 11 is embedded with the lock vertical wall portion 35 of the lock ring 30. As described above, the material constituting the thermoplastic synthetic resin wall of the outer layer 2 advances to the fixing hole 36 or the notch portion of the lock ring 30. Therefore, the lock ring 30 is solidly fixed to the opening portion 10.

The folded portion 12 is integrally and continuously formed from the front end of the cylindrical portion 11 of the opening portion 10, folded in a direction of enlarging a diameter of the cylindrical portion 11, that is, from the front end of the cylindrical portion 11 to an outer side orthogonal thereto, and folded in a hairpin shape in a direction of the center of the opening portion 10 to be folded at a vicinity of the center and formed to provide an outer face in parallel with the opening face of the opening portion 10 by laminating together layers of the thermoplastic synthetic resin on upper and lower sides thereof.

Therefore, the folded portion 12 is constituted by two layers of the outer layers 2, the inner layers 3 and the middle layers 4 constituting the wall of the fuel tank main body 1 by laminating together the layers in the up and down direction. Therefore, the opening portion 10 is continuously and integrally formed from the fuel tank main body 1 by the same material, excellent in hermetically closing performance, and can ensure a wall thickness and can ensure a strength at a portion thereof other than the compression portion 13 of the folded portion 12. Further, owing to presence of the middle layer 4, permeation of the fuel can also be prevented.

The folded portion 12 is formed by being compressed from the face of the opening portion 10 in a direction orthogonal thereto to form the compression portion 13 more thin-walled than other portion, and the compression portion 13 is formed with a groove portion 17 having a section in a recess shape over an entire periphery of the opening portion 10. The groove portion 17 of the compression portion 13 is mounted with a seal ring 50 made of rubber and having a section in a circular shape and when the lid member 40 is attached to the opening portion 10, the seal ring 50 is brought into contact with a rear face of the lid member 40 to be able to seal between the lid member 40 and the opening portion 10. In order to mount the seal ring 50 to the groove portion 17, the seal ring 50 can firmly be held at a predetermined position necessary for sealing the lid member 40.

As described later, a surface of the groove portion 17 is formed to be smooth by a slide die 61, and therefore, the surface is excellent in sealing performance by bringing the seal ring 50 into close contact therewith.

A portion of a bottom of the groove portion 17 of the compression portion 13 is brought into a thin-walled state by compressing the folded portion 12. Further, the middle layer 4 is folded to be present at the center portion, and the outer layer 2 is present in a thin-walled state on upper and lower sides of the middle layer 4.

The folded portion 12 can ensure the strength since an outer face thereof is formed by the outer layer 2 of the fuel tank main body 1 and the folded portion 12 can prevent permeation of the fuel since the inner portion thereof includes the middle layer 4.

Further, the folded portion 12 includes the thin-walled compression portion 13, and therefore, the wall thickness of the opening portion 10 can be thinned by the compression portion 13, particularly, the wall thickness of the outer layer 2 of the uppermost layer can be thinned and it can be minimized that the fuel at inside of the tank permeates the outer layer 2 of the compression portion 13 from the end face of the opening portion 10.

Next, a method of fabricating the opening portion 10 of the fuel tank will be explained in reference to FIG. 6 and FIG. 7.

The fuel tank main body 1 is formed by blow forming and also the opening portion 10 is formed simultaneously with the blow forming.

First, a main body of the blow forming die 60 is constituted by an inner side die 62 and an outer side die 63. An opening is formed at a portion of the blow forming die 60 for forming the opening portion 10 and the opening is fitted with the slide die 61 slidably in an inner and outer direction. A projected rib portion 64 is formed at a surrounding of an inner face of the slide die 61.

As shown in FIG. 6, the lock ring 30 is interposed between the inner side die 62 and the outer side die 63 of the opening of the blow forming die 60 and blow forming is carried out. In blow forming, first, the slide die 61 is slid to an outer side, or in FIG. 6, to an upper side. Air is blown to an inner portion of a parison of the thermoplastic synthetic resin member comprising the outer layer 2, the inner layer 3 and the middle layer 4 forming the fuel tank main body 1, the synthetic resin member is swollen to an outer side and is brought into contact with the slide die 61 slid to the outer side. Thereafter, the slide die 61 is slid to an inner side, or in FIG. 6, to a lower side while maintaining an inner pressure of the parison to be brought into a state as shown in FIG. 7.

When the slide die 61 is slid, while the parison of the synthetic resin member is brought into contact with the inner face of the blow forming die 60, the fuel tank main body 1 and the opening portion 10 are formed. At this occasion, the lock ring 30 is embedded to an inner portion of the parison of the synthetic resin member.

That is, the lock vertical wall portion 35 of the lock ring 30 is embedded to the portion of the outer layer 2 of the cylindrical portion 11 of the opening portion 10, the lower face of the folded portion 12 is brought into contact with the upper face of the lock flat plate portion 34 of the lock ring 30, and in accordance with moving down the slide die 61, according to the folded portion 12 the folded portion 12 is compressed to crush the folded portion 12 in the hairpin shape to form.

Simultaneously with compressing the folded portion 12, a portion of the folded portion 12 is compressed by the projected rib portion 64 to form the compression portion 13.

The compression portion 13 is compressed by being clamped by the lock flat plate portion 34 of the lock ring 30 and the projected rib portion 64, and therefore, the compression portion 13 is formed to be thin-walled uniformly and the groove portion 17 in the shape of the recess groove is formed at the upper face of the compression portion 13. As described above, the groove portion 17 is mounted with the seal ring 50 made of rubber. The bottom face of the groove portion 17 is formed to be smooth since the bottom face is formed by being compressed by the projected rib portion 64 of the slide die 61 and is excellent in sealing performance since the seal ring 50 is brought into close contact with the smooth face.

After forming the folded portion 12, the fuel tank main body 1 is taken out from the blow forming die 60, a portion of the opening fitted with the lid portion 16 is cut to be removed to thereby form the opening portion 10.

What is claimed is:

1. A structure of an opening portion of a fuel tank, comprising:
   a fuel tank main body made of a thermoplastic synthetic resin having at least an outer layer, an inner layer and a middle layer therebetween;
   an opening portion being integrally formed with the fuel tank main body, the opening portion including an opening face connected to the fuel tank main body through a cylindrical portion, the cylindrical portion extending from the fuel tank main body toward an outer side of the fuel tank main body;

the cylindrical portion including a laminate with layers of a thermoplastic synthetic resin on upper and lower sides thereof and having an outer face arranged parallel with the opening face of the opening portion; the cylindrical portion further including a folded portion extending from a front end of the cylindrical portion in a direction of enlarging diameter of the cylindrical portion toward the outer side of the fuel tank main body and folding in a hairpin shape in a direction toward a center of the opening portion, at least a portion of the folded portion of the cylindrical portion including a compression portion compressing the opening portion from a direction orthogonal thereto, the at least a portion of the folded portion of the cylindrical portion being more thinly walled than other portions of the folded portion;

a lid member covering the opening portion of the fuel tank main body;

a lock ring being integrally embedded in the outer layer of the cylindrical portion, the lock ring being made of metal and having a ring shape and lock holes, the ring shape of the lock ring including an upper face portion with the lock holes, the upper face portion having a plane in parallel with the opening face of the opening portion of the fuel tank main body for pressing a surrounding area of the lid member against the opening portion of the fuel tank main body, the lock holes respectively including a wide width portion and a narrow width portion extending in a circumferential direction, the lock ring including a stepped portion bent in steps from the upper face portion to a lower side thereof and terminating in a lower vertical wall portion, the lower vertical wall portion being folded to a lower side thereof in steps from the upper face portion, and the lower vertical wall portion being integrally embedded in the outer layer of the cylindrical portion of the fuel tank main body; and a lock plate securing the lid member to the opening portion of the fuel tank main body, the lock plate being made of metal and having a ring shape and engaging claw portions, the lock plate having an upper flat plate portion having a plane in parallel with the opening face of the opening portion of the fuel tank main body, the engaging claw portions include a bent L-shape extending from a front end of the lower vertical wall portion of the lock ring in a direction toward the center of the opening portion, and the engaging claw portions engaging with the lock holes arranged in the upper face portion of the lock ring;

wherein the engaging claw portions of the lock plate engage the lock holes of the lock ring and the lid member is clamped against the opening portion by the lock plate for closing the opening portion of the fuel tank main body.

2. The structure of an opening portion of a fuel tank according to claim 1, wherein the upper flat plate portion of the lock plate holds the outer layer of the opening portion on a lower side of a portion laminated with the compression portion, the vertical wall portion of the lock plate is formed with a plurality of notch portions or fixing holes and embedded with the outer layer of the opening portion and the thermoplastic synthetic resin of the outer layer invades the notch portions or the fixing holes.

3. The structure of an opening portion of a fuel tank according to claim 1, wherein the compression portion includes a groove having a channel-shape, a bottom face of the groove has a smooth face, and a seal member is arranged in the groove.

\* \* \* \* \*